United States Patent
Fallone et al.

(10) Patent No.: US 9,263,088 B2
(45) Date of Patent: Feb. 16, 2016

(54) DATA MANAGEMENT FOR A DATA STORAGE DEVICE USING A LAST RESORT ZONE

(71) Applicant: Western Digital Technologies, Inc., Irvine, CA (US)

(72) Inventors: Robert M. Fallone, Irvine, CA (US); Alec D. Parken, Pleasanton, CA (US); Teik Ee Yeo, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/295,497

(22) Filed: Jun. 4, 2014

(65) Prior Publication Data
US 2015/0269964 A1    Sep. 24, 2015

Related U.S. Application Data

(60) Provisional application No. 61/968,966, filed on Mar. 21, 2014.

(51) Int. Cl.
*G11B 20/12* (2006.01)
*G11B 19/04* (2006.01)

(52) U.S. Cl.
CPC .......... *G11B 20/1217* (2013.01); *G11B 19/041* (2013.01); *G11B 19/046* (2013.01); *G11B 2020/1242* (2013.01)

(58) Field of Classification Search
CPC .. G11B 5/5565; G11B 19/046; G11B 19/042; G11B 19/043; G11B 20/1217; G11B 2020/1242; G11B 19/041
USPC ................................................ 360/48, 31, 55
See application file for complete search history.

(56) References Cited

U.S. PATENT DOCUMENTS

| | | | |
|---|---|---|---|
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |

(Continued)

OTHER PUBLICATIONS

Anthony P. Sannino, et al., U.S. Appl. No. 14/260,641, filed Apr. 24, 2014, 18 pages.

(Continued)

*Primary Examiner* — Thomas Alunkal

(57) ABSTRACT

A data storage device (DSD) includes a non-volatile memory (NVM) media for storing data. A last resort zone of the NVM media is associated with a higher risk of data loss or data corruption than other portions of the NVM media and is reserved as unavailable for storing data. It is determined whether a current data storage capacity and/or an environmental condition for the NVM media has reached a threshold. The last resort zone is set as available for storing data if it is determined that the threshold has been reached and data is written in the last resort zone.

34 Claims, 5 Drawing Sheets

(56) References Cited

U.S. PATENT DOCUMENTS

| | | |
|---|---|---|
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |

(56) References Cited

U.S. PATENT DOCUMENTS

| | | |
|---|---|---|
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,017 B2 * | 5/2006 | Ozaki .............. G11B 20/10527 365/201 |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,184,241 B1 * | 2/2007 | Mallary .................. G11B 5/40 360/57 |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,304,816 B2 | 12/2007 | Johnson et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,339 B2 | 5/2008 | Kojima et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,373,559 B2 | 5/2008 | Guha |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,496,796 B2 | 2/2009 | Kubo et al. |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |

(56) References Cited

U.S. PATENT DOCUMENTS

| | | |
|---|---|---|
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Elliott et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton et al. |
| 8,799,977 B1 | 8/2014 | Kapner, III et al. |
| 9,042,181 B2 * | 5/2015 | Flynn ............... G11C 16/14 365/185.18 |
| 2004/0042105 A1 * | 3/2004 | Cho .................. G11B 5/012 360/31 |
| 2004/0051988 A1 | 3/2004 | Jing et al. |
| 2007/0171798 A1 * | 7/2007 | Wada ............... G11B 7/0956 369/53.19 |
| 2009/0113702 A1 | 5/2009 | Hogg |
| 2010/0083373 A1 * | 4/2010 | White ................ G06F 3/017 726/21 |
| 2010/0306551 A1 | 12/2010 | Meyer et al. |
| 2011/0002206 A1 * | 1/2011 | Akahoshi ......... G11B 7/00375 369/47.14 |
| 2011/0226729 A1 | 9/2011 | Hogg |
| 2012/0159042 A1 | 6/2012 | Lott et al. |
| 2012/0194940 A1 * | 8/2012 | Yoshida ............... G11B 5/09 360/53 |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0031317 A1 | 1/2013 | Ryu et al. |
| 2014/0201424 A1 | 7/2014 | Chen et al. |
| 2014/0285922 A1 * | 9/2014 | Ishii ............... G11B 5/59688 360/77.05 |

OTHER PUBLICATIONS

Chun Sei Tsai, et al., U.S. Appl. No. 14/227,191, filed Mar. 27, 2014, 25 pages.

Robert M. Fallone, et al., U.S. Appl. No. 14/295,497, filed Jun. 4, 2014 24 pages.

Daniel Bai, "Method of Improving Robustness of HDD by Utilization Prioritization," Power Point Presentation, Dec. 26, 2013, pp. 1-8.

* cited by examiner

DATA MANAGEMENT FOR A DATA STORAGE DEVICE USING A LAST RESORT ZONE

CROSS-REFERENCE TO RELATED APPLICATION

This application claims the benefit of U.S. Provisional Application No. 61/968,966, filed on Mar. 21, 2014, which is hereby incorporated by reference in its entirety.

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk.

Data stored on the disk may become susceptible to corruption or data loss due to a variety of conditions. For example, data stored on a particular area of the disk surface may become unreadable if the DSD is dropped and components of the DSD contact the disk surface. In another example, contaminants or surface defects may also cause loss or corruption of data written on the disk.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
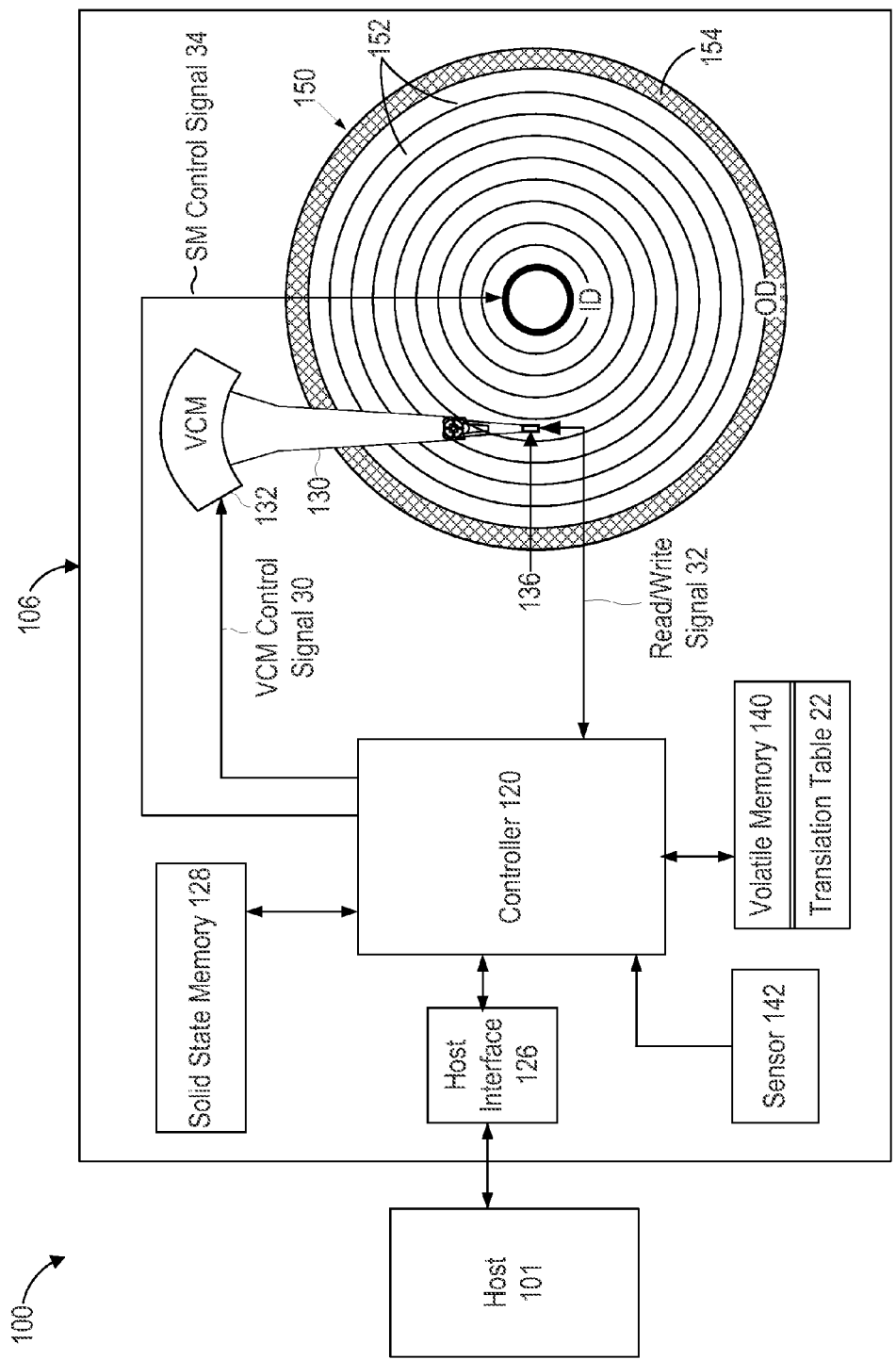
FIG. 1 is a block diagram depicting a Data Storage Device (DSD) according to an embodiment.

FIG. 1 shows computer system 100 according to an embodiment which includes host 101 and Data Storage Device (DSD) 106. Computer system 100 can be, for example, a computer system (e.g., server, desktop, mobile/laptop, tablet, smartphone, etc.) or other electronic device such as a digital video recorder (DVR). In this regard, computer system 100 may be a stand-alone system or part of a network. Those of ordinary skill in the art will appreciate that system 100 and DSD 106 can include more or less than those elements shown in FIG. 1 and that the disclosed processes can be implemented in other environments.

In the example embodiment of FIG. 1, DSD 106 includes both solid state memory 128 and disk 150 for storing data. In this regard, DSD 106 can be considered a Solid State Hybrid Drive (SSHD) in that it includes both solid state Non-Volatile Memory (NVM) media and disk NVM media. In other embodiments, each of disk 150 or solid state memory 128 may be replaced by multiple Hard Disk Drives (HDDs) or multiple Solid State Drives (SSDs), respectively, so that DSD 106 includes pools of HDDs or SSDs. In yet other embodiments, the NVM media of DSD 106 may only include disk 150 or solid state memory 128.

DSD 106 includes controller 120 which includes circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a System on a Chip (SoC).

Host interface 126 is configured to interface DSD 106 with host 101 and may interface according to a standard such as, for example, PCI express (PCIe), Serial Advanced Technology Attachment (SATA), or Serial Attached SCSI (SAS). As will be appreciated by those of ordinary skill in the art, host interface 126 can be included as part of controller 120.

Sensor 142 detects an environmental condition of DSD 106, such as a temperature, acceleration, or vibration of DSD 106, and provides an input to controller 120 based on the detected condition. In some embodiments, controller 120 may modify operation of DSD 106 based on the input received from sensor 142. As discussed in more detail below, controller 120 may also set a last resort zone of NVM media as available for storing data if it is determined that an environmental condition has reached a threshold.

In the example of FIG. 1, disk 150 is rotated by a spindle motor (not shown). DSD 106 also includes head 136 connected to the distal end of actuator 130 which is rotated by Voice Coil Motor (VCM) 132 to position head 136 in relation to disk 150. Controller 120 can control the position of head 136 and the rotation of disk 150 using VCM control signal 30 and SM control signal 34, respectively.

As appreciated by those of ordinary skill in the art, disk 150 may form part of a disk pack with additional disks radially aligned below disk 150. In addition, head 136 may form part of a head stack assembly including additional heads with each head arranged to read data from and write data to a corresponding surface of a disk in a disk pack.

Disk 150 includes a number of radial spaced, concentric tracks (not shown) for storing data on a surface of disk 150. The tracks on disk 150 are grouped together into zones of tracks (e.g., zones 152 and last resort zone 154) with each track divided into a number of sectors that are spaced circumferentially along the tracks.

In some implementations, the tracks on disk 150 are written by a write element of head 136 using Shingled Magnetic Recording (SMR) so as to overlap adjacent tracks. SMR provides a way of increasing the amount of data that can be stored in a given area on disk 150 by overlapping tracks like roof shingles. The non-overlapping portion then serves as a narrow track that can be read by a read element of head 136.

Although a higher number of tracks per inch is ordinarily possible with SMR, the overlap in tracks can generally prevent new writes to a previously overlapped track since such new writes would affect data written in the overlapping track.

For this reason, tracks are usually sequentially written in SMR implementations to avoid affecting previously written data.

In the embodiment of FIG. 1, last resort zone 154 is associated with a higher risk of data loss than other portions of the NVM media of DSD 106. For example, last resort zone 154 can include an area of disk 150 that may often become damaged as a result of mechanical shock to DSD 106. Such mechanical shock may occur when DSD 106 is dropped during operation or when DSD 106 is initially tested by a manufacturer.

In FIG. 1, last resort zone 154 is located in an Outer Diameter (OD) portion of disk 150. The OD portion of disk 150 may become damaged when DSD 106 is dropped during operation as DSD 106 takes precautionary measures to move head 136 away from disk 150 to reduce the likelihood of damage to disk 150 upon impact. In addition, the OD portion of disk 150 may become damaged during a manufacturer's mechanical shock testing of DSD 106 if disk 150 is addressed beginning at the OD portion of disk 150.

In other embodiments, last resort zone 154 can be located in different portions of disk 150 or in a portion of solid state memory 128. In one embodiment, last resort zone 154 is located in an Inside Diameter (ID) portion of disk 150. The ID portion of disk 150 may be associated with a higher risk of data loss due to an increased amount of contaminants near the ID portion or from other disk surface irregularities caused by clamping disk 150 to a spindle (not shown). In other embodiments, last resort zone 154 can be assigned during operation or factory testing as a zone with more than a predetermined number of defects or errors.

In addition to disk 150, the NVM media of DSD 106 also includes solid state memory 128 for storing data. While the description herein refers to solid state memory generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof. Where DSD 106 stores data in solid state memory 128, last resort zone 154 could be a location such as a page, block, die, etc. in solid state memory 128 that may have certain detected or known weaknesses/conditions similar to those described above, and the embodiments described herein can equally apply to such cases as well.

Volatile memory 140 can include, for example, a Dynamic Random Access Memory (DRAM) which can be used by DSD 106 to temporarily store data. Data stored in volatile memory 140 can include data read from NVM media (e.g., disk 150 or solid state memory 128), data to be written to NVM media, instructions loaded from firmware of DSD 106 for execution by controller 120, or data used in executing firmware of DSD 106.

As shown in the embodiment of FIG. 1, volatile memory 140 stores translation table 22, which provides a mapping between Logical Block Addresses (LBAs) used by host 101 to address data and physical locations (e.g., Physical Block Addresses (PBAs)) indicating physical locations on disk 150 or in solid state memory 128. In one implementation, a backup copy of a translation table is stored on disk 150 which is updated to account for changes to translation table 22 stored in volatile memory 140. In other embodiments, translation table 22 may be stored in a different location such as in solid state memory 128. Translation table 22 is described in more detail below with reference to FIGS. 2A and 2B.

In operation, host interface 126 receives read and write commands from host 101 via host interface 126 for reading data from and writing data to the NVM media of DSD 106. In response to a write command from host 101, controller 120 may buffer the data to be written for the write command in volatile memory 140.

For data to be written to disk 150, controller 120 can encode the buffered data into write signal 32 which is provided to head 136 for magnetically writing data to the surface of disk 150.

In response to a read command for data stored on disk 150, controller 120 positions head 136 via VCM control signal 30 to magnetically read the data stored on the surface of disk 150. Head 136 sends the read data as read signal 32 to controller 120 for decoding, and the data is buffered in volatile memory 140 for transferring to host 101.

For data to be stored in solid state memory 128, controller 120 receives data from host interface 126 and may buffer the data in volatile memory 140. In one implementation, the data is then encoded into charge values for charging cells (not shown) of solid state memory 128 to store the data.

In response to a read command for data stored in solid state memory 128, controller 120 in one implementation reads current values for cells in solid state memory 128 and decodes the current values into data that can be transferred to host 101. Such data may be buffered by controller 120 before transferring the data to host 101 via host interface 126.

Figure 2A:
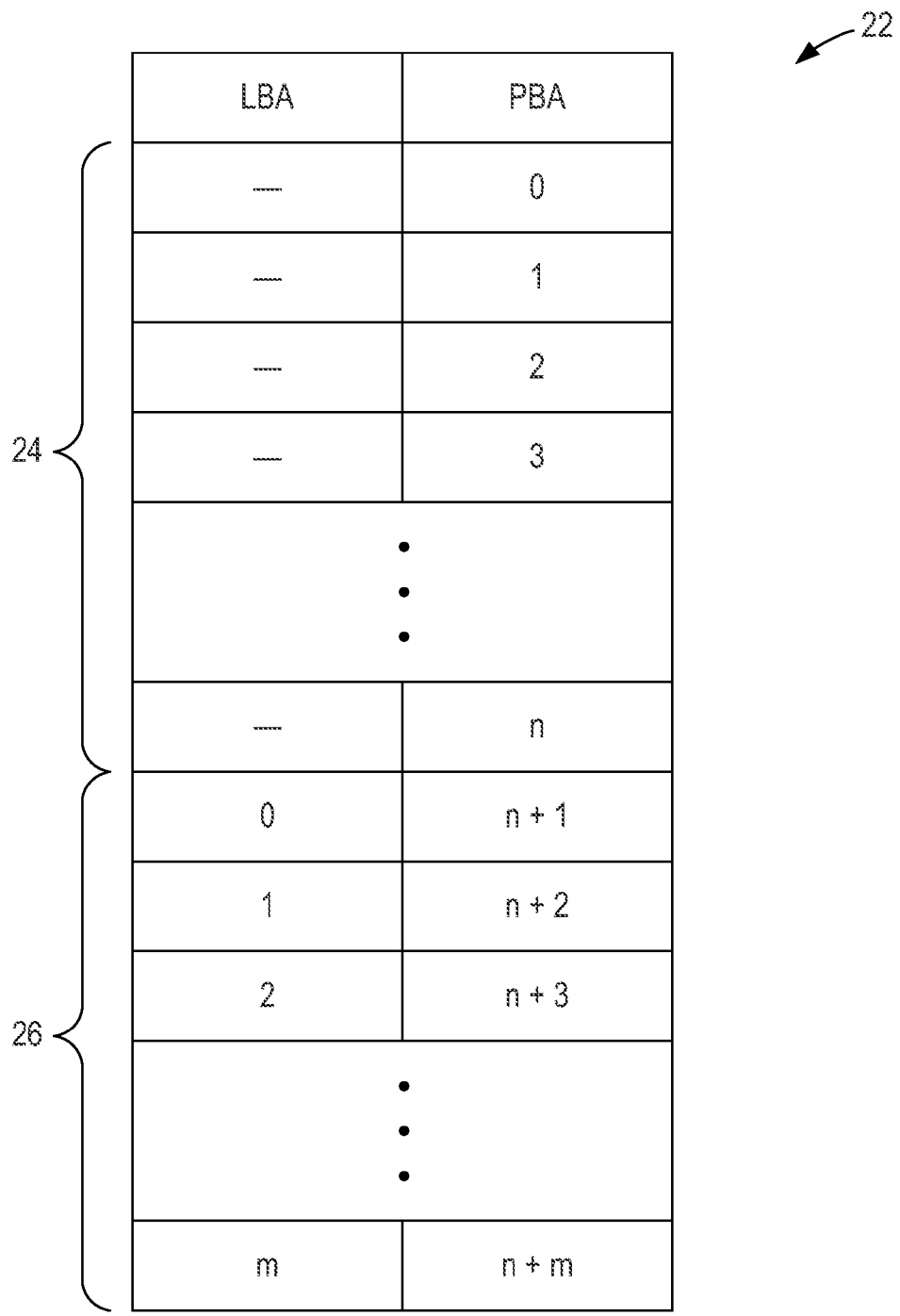
FIG. 2A is an example of a translation table with a last resort zone that has been reserved as unavailable for storing data according to an embodiment.
Figure 2B:
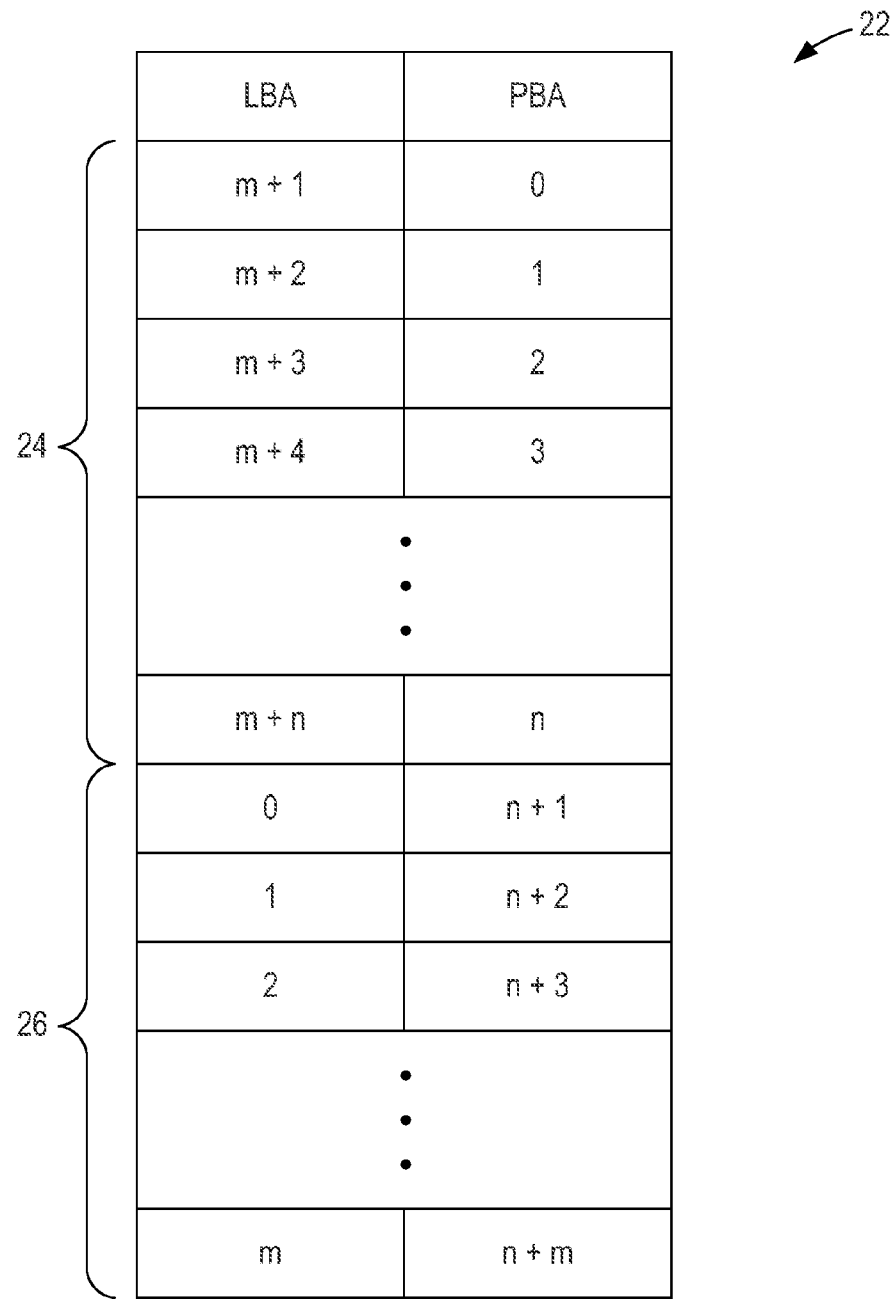
FIG. 2B depicts the translation table of FIG. 2B after the last resort zone has been set as available for storing data according to an embodiment.

FIG. 2A provides an example of translation table 22 with last resort zone 154 reserved as unavailable for storing data according to an embodiment. In the embodiment of FIGS. 2A and 2B, controller 120 manages access to NVM media using translation table 22. In this regard, translation table 22 is used to map LBAs for associated data to PBAs corresponding to physical locations where the associated data is stored in the NVM media. Controller 120 maintains translation table 22 in volatile memory 140 to keep track of the changes made to the data stored in the NVM media of DSD 106. As noted above, translation table 22 may also be stored, or alternatively stored, in solid state memory 128 or disk 150.

In some implementations, translation table 22 is used as part of an indirection process for SMR zones on disk 150. When data is updated for a particular LBA, the update is often written in a different location on disk 150 than where the data for the LBA was previously written to avoid having to rewrite an entire SMR zone of overlapping tracks. A translation table, such as translation table 22, can be used to keep track of where the current versions of the data are stored for a particular LBA.

As shown in FIG. 2A, each entry (i.e., row) of translation table 22 includes an LBA and a PBA which is mapped to the LBA for the entry. In other embodiments, translation table 22 can include LBA ranges mapped to PBA ranges which can be represented with a starting address and an extent length.

The PBAs in translation table 22 indicate locations in the NVM media of DSD 106 such as locations on disk 150 or in solid state memory 128. Entries 24 of translation table 22 include PBAs for last resort zone 154 and entries 26 of translation table 22 include PBAs for portions of the NVM media that are outside of last resort zone 154. In the example of FIG. 2A, the PBAs for last resort zone 154 begin at PBA 0 and continue to PBA n. The PBAs for the portions of NVM media outside of last resort zone 154 begin at PBA n+1 and continue to PBA n+m.

As noted above, the physical location of last resort zone 154 is not limited to an OD portion of disk 150 in other embodiments. Similarly, the range of PBAs identifying last resort zone 154 is not limited to a particular range of PBAs. For example, the range of PBAs for last resort zone 154 in other embodiments may occur at the end of a total PBA range for the NVM media or between the end and beginning of the total PBA range for the NVM media.

In the example of FIG. 2A, last resort zone 154 has been reserved by having no LBAs allocated to entries 24 and with LBAs having been allocated to locations outside of last resort zone 154. This is shown by the LBAs allocated for entries 26 but not for entries 24. When performing read and write commands for host 101, DSD 106 will access the portions of the NVM media corresponding to entries 26 without accessing last resort zone 154. Since last resort zone 154 is not allocated LBAs, it is not yet visible or available to host 101.

Although entries 26 have been allocated LBAs 0 to m, the LBAs for entries 26 do not need to be sequentially ordered with respect to their respective PBAs. Moreover, the use of LBA indirection for disk 150 or solid state memory 128 can result in a non-sequential ordering of LBAs with respect to the corresponding PBAs.

Once a storage capacity associated with entries 26 has reached a threshold, controller 120 can set last resort zone 154 as available for storing data by allocating LBAs to entries 24 for last resort zone 154. This can ordinarily allow for DSD 106 to reduce the likelihood of data loss or corruption by waiting until all or most of the NVM media outside of last resort zone 154 has been used before storing data in the more vulnerable last resort zone 154.

In other embodiments, controller 120 can set last resort zone 154 as available for storing data based on whether an environmental condition for the NVM media has reached a threshold. For example, sensor 142 may detect a high operating temperature for solid state memory 128 or disk 150 that may make it more likely to encounter an error in storing or retrieving data from the NVM media. Sensor 142 can provide an input to controller 120 indicating a high temperature condition, and controller 120 may then set last resort zone 154 as available for storing data by allocating LBAs to entries 24 for last resort zone 154. This can ordinarily allow for DSD 106 to save less vulnerable portions of the NVM media for storing data when there is less likely to be an error due to the environmental condition. Controller 120 may also follow particular write settings to safeguard against data loss when storing data in last resort zone 154 or may store a duplicate copy of the data to protect against data loss or corruption due to the environmental condition.

In another example, sensor 142 may detect an environmental condition of a high vibration condition that may make it more likely to encounter an error in storing or retrieving data from the NVM media. Sensor 142 can provide an input to controller 120 indicating the high vibration condition, and controller 120 may then set last resort zone 154 as available for storing data by allocating LBAs to entries 24 for last resort zone 154. Different write settings can then be used when writing data in last resort zone 154 to reduce the likelihood of an error during the environmental condition.

In yet other embodiments, controller 120 can set last resort zone 154 as available for storing data when both a current data storage capacity and an environmental condition have reached a threshold. In other words, controller 120 may only set last resort zone 154 as available after a certain amount of data has been stored outside of last resort zone 154 and sensor 142 detects a particular environmental condition.

As noted above, DSD 106 may also change the way in which it writes data in last resort zone 154 when compared to areas outside of last resort zone 154. For example, controller 120 may perform a write verification process (e.g., a conditioned write verify process) for data written in last resort zone 154 where data is read after it has been written to verify the written data.

In another example, controller 120 may reduce the number of write retries when attempting to write data in a sector of last resort zone 154. In more detail, controller 120 may control head 136 to attempt to write data in a particular sector for a predetermined number of write retries before relocating the data to a different sector such as a spare sector. Controller 120 may reduce the number of write retries such as from ten write retries to only three when writing data in last resort zone 154. This can be done to improve the time for completing write commands in last resort zone 154 since it may be more likely that additional write retries will be unsuccessful if last resort zone 154 has been identified as having a large amount of defects.

In addition, controller 120 may adjust write settings for writing data in last resort zone 154 by changing a track density for writing data in last resort zone 154. In one example, the track density or a number of Tracks Per Inch (TPI) can be decreased so as to reduce the chances of encountering errors when reading or writing data in last resort zone 154. Since more errors can be expected when tracks are in closer proximity to each other, lowering the track density for last resort zone 154 can generally lessen the likelihood of errors in last resort zone 154, which is already more susceptible to errors.

Controller 120 may also limit the types of data written in last resort zone 154. In this regard, the data written in last resort zone 154 may be required to have a duplicate copy stored outside of last resort zone 154 to prevent loss of the data. In one example, last resort zone 154 may be used as a scratch area for performing garbage collection of zones 152 so that a copy of data stored in a particular zone 152 is stored in last resort zone 154 while the zone 152 is garbage collected.

Less stringent write settings may be used based on whether there is a duplicate copy of the data stored outside of last resort zone 154. For example, as long as a copy of the data exists elsewhere in the NVM media, controller 120 may relax the write settings for writing the data in last resort zone 154 by, for example, not performing a write verification of the copy stored in last resort zone 154.

In another implementation, the data written in last resort zone 154 may be data that is accessed with a reading frequency and/or a writing frequency outside of a threshold frequency or data with a lower priority, since this data may be at a higher risk of loss or corruption by being stored in last resort zone 154. In one such example, controller 120 may store cold data in last resort zone 154 that is not frequently accessed for reading or writing.

FIG. 2B depicts translation table 22 after last resort zone 154 has been set as available for storing data according to an embodiment. As shown in FIG. 2B, LBAs have been allocated to entries 24 for last resort zone 154. The allocated LBAs begin with m+1 and continue to m+n. As discussed in more detail below with reference to FIG. 3, the allocation of LBAs to last resort zone 154 occurs after controller 120 determines that a current data storage capacity for the NVM media has reached a threshold. After allocating the LBAs to last resort zone 154, DSD 106 can perform read and write commands in last resort zone 154 and last resort zone 154 becomes visible or available to host 101.

Figure 3:
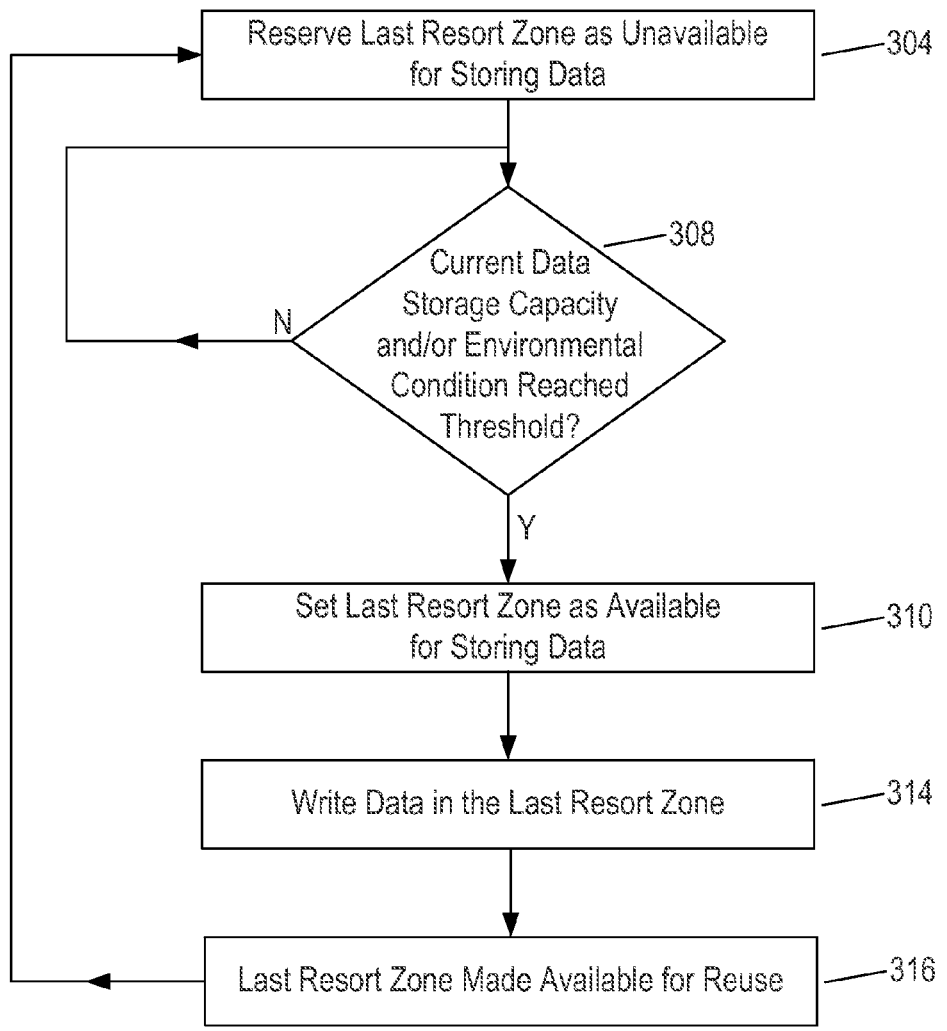
FIG. 3 is a flowchart for a data management process according to an embodiment.

FIG. 3 is a flowchart for a data management process that can be performed by controller 120 according to an embodiment. The process of FIG. 3 begins in block 304 with controller 120 reserving last resort zone 154 as unavailable for storing data. This can be accomplished as noted above with FIG. 2A by allocating LBAs to portions of the NVM media outside of last resort zone 154 without allocating LBAs to last resort zone 154.

In block 308, controller 120 determines whether a current data storage capacity and/or an environmental condition has reached a threshold. The threshold for the current data storage capacity can be, for example, a total capacity for the portions of NVM media outside of last resort zone 154 or within a certain percentage of such a total capacity. In some implementations, this can include determining a remaining amount of data capacity available for the portion of the NVM media corresponding to entries 26 or to entries 24 and 26 in translation table 22. In other implementations, the current data storage capacity can include an amount of data stored in the NVM media for the portion of the NVM media corresponding to entries 26 or to entries 24 and 26.

The threshold for an environmental condition can be, for example, a particular temperature or an amount of vibration detected by sensor 142. In other examples, reaching the threshold may require both a certain data storage capacity and a particular environmental condition such as only 95% of the NVM media being available to store data and a temperature of DSD 106 being above a certain operating temperature.

If it is determined in block 308 that the threshold has not been reached, the process will return to block 308 to again determine whether the threshold has been reached. The determination of block 308 may be performed at a fixed interval of time, after certain events of DSD 106, or during idle periods of DSD 106. In some implementations, controller 120 may keep a running total of the current data storage capacity such that the current data storage capacity is updated each time data is stored in the NVM media.

If it is determined that the threshold has been reached in block 308, controller 120 in block 310 sets last resort zone 154 as available for storing data. As discussed above, this can be accomplished by allocating LBAs to last resort zone 154. In block 314, data is written in last resort zone 154 until last resort zone 154 is made available for reuse in block 316. In more detail, last resort zone 154 may be garbage collected or otherwise freed up as part of a maintenance operation of DSD 106. Once last resort zone 154 has been made available for reuse, the process of FIG. 3 returns to block 304 to repeat the process for last resort zone 154.

Figure 4:
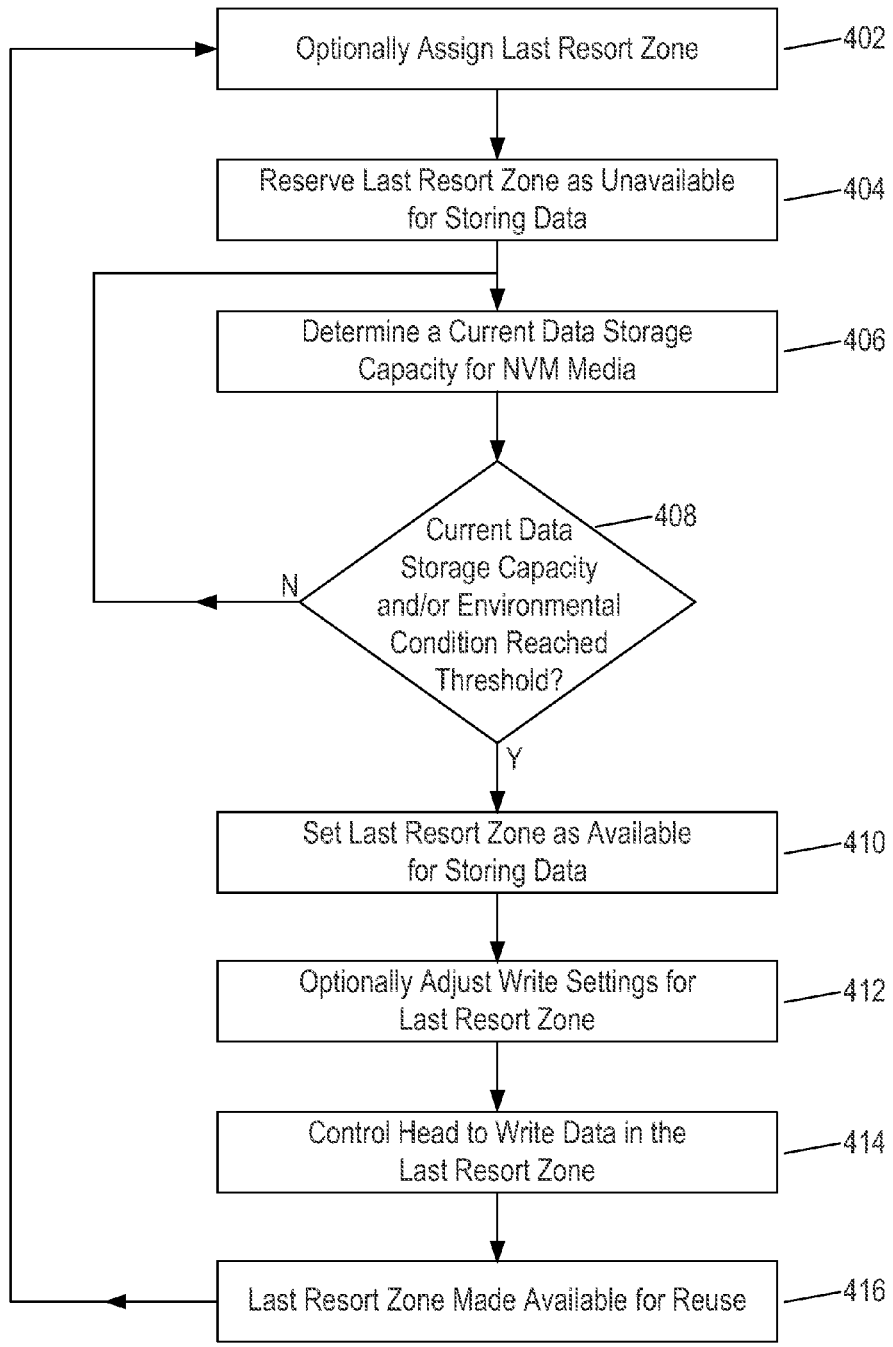
FIG. 4 is a flowchart for a data management process according to another embodiment.

FIG. 4 is a flowchart for a different data management process that can be performed by controller 120 according to an embodiment. The process of FIG. 4 begins in block 402 with controller 120 optionally assigning last resort zone 154 to a portion of the NVM media of DSD 106. The assignment of last resort zone 154 may occur during an initial startup of DSD 106, a factory testing process of DSD 106, or in the field during operation of DSD 106. In this regard, controller 120 may reassign last resort zone 154 from a default zone to a new zone during operation of DSD 106. In other embodiments, last resort zone 154 may be set by the manufacturer and remain at a fixed location.

In block 404, controller 120 reserves last resort zone 154 as unavailable for storing data. This can be accomplished as noted above with FIG. 2A by allocating LBAs to portions of the NVM media outside of last resort zone 154 without allocating LBAs to last resort zone 154.

In block 406, controller 120 determines a current data storage capacity for the NVM media. In some implementations, this can include determining a remaining amount of data capacity available for the portion of the NVM media corresponding to entries 26 or to entries 24 and 26 in translation table 22. In other implementations, the current data storage capacity can include an amount of data stored in the NVM media for the portion of the NVM media corresponding to entries 26 or to entries 24 and 26.

In block 408, controller 120 determines whether a current data storage capacity and/or an environmental condition has reached a threshold as discussed above with reference to block 308 of FIG. 3.

If it is determined in block 408 that the threshold has not been reached, the process returns to block 406 to determine a new current data storage capacity. The determination of the current data storage capacity in block 406 may be performed at a fixed interval of time, after certain events of DSD 106, or during idle periods of DSD 106. In some implementations, controller 120 may keep a running total of the current data storage capacity such that the current data storage capacity is updated each time data is stored in the NVM media.

If it is determined that the threshold has been reached in block 408, controller 120 in block 410 sets last resort zone 154 as available for storing data. As discussed above, this can be accomplished by allocating LBAs to last resort zone 154.

In block 412, controller 120 optionally adjusts write settings for last resort zone 154. As noted above, this can, for example, include reading data written in last resort zone 154 to verify that the data has been correctly written, changing a track density for last resort zone 154, or adjusting the number of write retires when writing data in last resort zone 154. The type of data allowed to be stored in last resort zone 154 may also be set in block 412, such as restricting the data stored in last resort zone 154 to copies of data stored elsewhere or restricting the data stored in last resort zone 154 to data of a lower priority or lower frequency of access. In other embodiments, data may be written in last resort zone 154 without any adjustment in write settings or type of data allowed to be stored in last resort zone 154.

In block 414, controller 120 controls head 136 to write data in last resort zone 154. After last resort zone 154 is made available for reuse as discussed above for block 316 of FIG. 3, the process of FIG. 4 returns to block 402 to optionally assign last resort zone 154.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage device (DSD) comprising:
    non-volatile memory (NVM) media including a last resort zone associated with a higher risk of data loss or data corruption than other portions of the NVM media; and
    a controller configured to:
    assign the last resort zone to a portion of the NVM media when more than a predetermined number of defects or errors are identified in the portion of the NVM;
    reserve the last resort zone as unavailable for storing data;
    determine whether a current data storage capacity and/or an environmental condition for the NVM media has reached a threshold;
    set the last resort zone as available for storing data if it is determined that the threshold has been reached; and
    write data in the last resort zone.

2. The DSD of claim 1, wherein the NVM media includes a magnetic media.

3. The DSD of claim 1, wherein the NVM media includes a solid state memory.

4. The DSD of claim 1, wherein the controller is further configured to manage access of the NVM media using an address translation table.

5. The DSD of claim 1, wherein the controller is further configured to set the last resort zone as available for storing data by allocating logical addresses to the last resort zone.

6. The DSD of claim 1, wherein the controller is further configured to reserve the last resort zone by allocating logical addresses to portions of the NVM media outside of the last resort zone without allocating logical addresses to the last resort zone.

7. The DSD of claim 1, wherein the NVM media includes a disk and the last resort zone is located on the disk.

8. The DSD of claim 7, wherein the last resort zone is located in an outer diameter portion of the disk.

9. The DSD of claim 8, further comprising a head for reading and writing data on the disk, and wherein the last resort zone is more susceptible to contact by the head than other portions of the disk.

10. The DSD of claim 7, wherein the last resort zone is located in an inner diameter portion of the disk.

11. The DSD of claim 7, wherein the controller is further configured to adjust write settings for writing data in the last resort zone.

12. The DSD of claim 11, wherein each track on the disk includes a plurality of sectors, and wherein the controller is further configured to:
    attempt to write data in a particular sector of the plurality of sectors for a predetermined number of write retries; and
    adjust write settings for writing data in the last resort zone by reducing the predetermined number of write retries when attempting to write data in the last resort zone.

13. The DSD of claim 11, wherein the controller is further configured to adjust write settings for writing data in the last resort zone by reading data written in the last resort zone to verify the data written in the last resort zone.

14. The DSD of claim 11, wherein the controller is further configured to adjust write settings for writing data in the last resort zone by changing a track density for writing data in the last resort zone.

15. The DSD of claim 11, wherein the controller is further configured to adjust write settings for writing data in the last resort zone based on whether there is a duplicate copy of the data written in the NVM media outside of the last resort zone.

16. The DSD of claim 1, wherein the data written in the last resort zone includes data accessed with a reading frequency and/or a writing frequency outside of a threshold frequency.

17. The DSD of claim 1, wherein the environmental condition includes at least one of an operating temperature and a vibration condition of the DSD.

18. A method for operating a data storage device (DSD) including non-volatile memory (NVM) media, the method comprising:
    assigning a last resort zone to a portion of the NVM media when more than a predetermined number of defects or errors are identified in the portion of the NVM, wherein the last resort zone is associated with a higher risk of data loss or data corruption than other portions of the NVM media;
    reserving the last resort zone of the NVM media as unavailable for storing data;
    determining whether a current data storage capacity and/or an environmental condition for the NVM media has reached a threshold;
    setting the last resort zone as available for storing data if it is determined that the threshold has been reached; and
    writing data in the last resort zone.

19. The method of claim 18, wherein the NVM media includes a magnetic media.

20. The method of claim 18, wherein the NVM media includes a solid state memory.

21. The method of claim 18, further comprising managing access of the NVM media using an address translation table.

22. The method of claim 18, further comprising setting the last resort zone as available for storing data by allocating logical addresses to the last resort zone.

23. The method of claim 18, further comprising reserving the last resort zone by allocating logical addresses to portions of the NVM media outside of the last resort zone without allocating logical addresses to the last resort zone.

24. The method of claim 18, wherein the NVM media includes a disk and the last resort zone is located on the disk.

25. The method of claim 24, wherein the last resort zone is located in an outer diameter portion of the disk.

26. The method of claim 25, wherein the last resort zone is more susceptible to contact by a head of the DSD than other portions of the disk.

27. The method of claim 24, wherein the last resort zone is located in an inner diameter portion of the disk.

28. The method of claim 24, further comprising adjusting write settings for writing data in the last resort zone.

29. The method of claim 28, wherein the disk includes a plurality of sectors for storing data, and wherein the method further comprises:
    attempting to write data in a particular sector of the plurality of sectors for a predetermined number of write retries; and
    adjusting write settings for writing data in the last resort zone by reducing the predetermined number of write retries when attempting to write data in the last resort zone.

30. The method of claim 28, further comprising adjusting write settings for writing data in the last resort zone by reading data written in the last resort zone to verify the data written in the last resort zone.

31. The method of claim 28, further comprising adjusting write settings for writing data in the last resort zone by changing a track density for writing data in the last resort zone.

32. The method of claim 28, further comprising adjusting write settings for writing data in the last resort zone based on whether there is a duplicate copy of the data written in the NVM media outside of the last resort zone.

33. The method of claim 18, wherein the data written in the last resort zone includes data accessed with a reading frequency and/or a writing frequency outside of a threshold frequency.

34. The method of claim 18, wherein the environmental condition includes at least one of an operating temperature and a vibration condition of the DSD.

* * * * *